(12) United States Patent
Nishio et al.

(10) Patent No.: US 9,763,237 B2
(45) Date of Patent: Sep. 12, 2017

(54) COMMUNICATION DEVICE AND SRS TRANSMISSION CONTROL METHOD

(71) Applicant: Sun Patent Trust, New York, NY (US)

(72) Inventors: Akihiko Nishio, Osaka (JP); Daichi Imamura, Beijing (CN)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 15/190,051

(22) Filed: Jun. 22, 2016

(65) Prior Publication Data

US 2016/0302191 A1 Oct. 13, 2016

Related U.S. Application Data

(63) Continuation of application No. 14/834,057, filed on Aug. 24, 2015, now Pat. No. 9,426,791, which is a (Continued)

(30) Foreign Application Priority Data

Nov. 16, 2010 (JP) .................................. 2010-255843

(51) Int. Cl.
*H04W 4/00* (2009.01)
*H04W 72/04* (2009.01)
(Continued)

(52) U.S. Cl.
CPC ........ *H04W 72/0413* (2013.01); *H04B 1/713* (2013.01); *H04L 1/0026* (2013.01);
(Continued)

(58) Field of Classification Search
None
See application file for complete search history.

(56) References Cited

U.S. PATENT DOCUMENTS 8,130,812 B2 3/2012 Kishiyama et al.
2010/0080187 A1 4/2010 Papasakellariou et al.
(Continued)

FOREIGN PATENT DOCUMENTS

JP 2010-35154 A 2/2010
JP 2010-220258 A 9/2010
(Continued)

OTHER PUBLICATIONS

3GPP TS 36.211 V8.7.0, "3rd Generation Partnership Project; Technical Specification Group Radio Access Network; Evolved Universal Terrestrial Radio Access (E-UTRA); Physical Channels and Modulation (Release 8)," May 2009, 83 pages.
(Continued)

*Primary Examiner* — Chi H Pham
*Assistant Examiner* — Fahmida Chowdhury
(74) *Attorney, Agent, or Firm* — Seed IP Law Group LLP

(57) ABSTRACT

Provided are a communication device and an SRS transmission method capable of reducing the possibility of a difference in recognition between the presence or absence of an SRS transmission between a base station and a terminal or of an SRS resource so as to prevent degradation of system throughput. At a terminal (200), a reception processing unit (203) detects control information indicating whether or not to request transmission of a sounding reference signal (SRS), whereupon a transmission signal forming unit (207) transmits an A-SRS by way of control by a transmission control unit (206) on the basis of control information. The transmission control unit (206) determines whether or not to execute SRS transmission on the basis of an "SRS Transmission Execution Rule" and the reception status of trigger information.

16 Claims, 8 Drawing Sheets

Related U.S. Application Data continuation of application No. 14/624,225, filed on Feb. 17, 2015, now Pat. No. 9,155,086, which is a continuation of application No. 13/883,255, filed as application No. PCT/JP2011/006145 on Nov. 2, 2011, now Pat. No. 8,989,129.

(51) Int. Cl.
*H04B 1/713* (2011.01)
*H04L 1/00* (2006.01)
*H04L 5/00* (2006.01)

(52) U.S. Cl.
CPC .......... *H04L 1/0027* (2013.01); *H04L 1/0029* (2013.01); *H04L 1/0072* (2013.01); *H04L 5/0048* (2013.01); *H04L 5/0055* (2013.01); *H04W 72/042* (2013.01); *H04W 72/0406* (2013.01); *H04L 5/0023* (2013.01); *H04L 5/0053* (2013.01); *H04L 5/0091* (2013.01)

(56) References Cited

U.S. PATENT DOCUMENTS

| | | |
|---|---|---|
| 2010/0273494 A1 | 10/2010 | Iwai et al. |
| 2010/0303019 A1 | 12/2010 | Iwai et al. |
| 2011/0007778 A1 | 1/2011 | Kishiyama et al. |
| 2011/0085458 A1 | 4/2011 | Montojo et al. |
| 2012/0252474 A1 | 10/2012 | Tiirola et al. |
| 2013/0182674 A1* | 7/2013 | Lunttila .................. H04L 5/001 370/329 |
| 2013/0242730 A1 | 9/2013 | Pelletier et al. |

FOREIGN PATENT DOCUMENTS

| | | |
|---|---|---|
| TW | 201401908 A | 1/2014 |
| WO | 2009/157414 | 12/2009 |
| WO | 2010/077041 A2 | 7/2010 |
| WO | 2010/126852 A1 | 11/2010 |
| WO | 2012/094447 | 7/2012 |

OTHER PUBLICATIONS

3GPP TS 36.212 V8.7.0, "3rd Generation Partnership Project; Technical Specification Group Radio Access Network; Evolved Universal Terrestrial Radio Access (E-UTRA); Multiplexing and channel coding (Release 8)," May 2009, 60 pages.

3GPP TS 36.213 V8.7.0, "3rd Generation Partnership Project; Technical Specification Group Radio Access Network; Evolved Universal Terrestrial Radio Access (E-UTRA); Physical layer procedures (Release 8)," May 2009, 77 pages.

International Search Report dated Dec. 27, 2011, for corresponding International Application No. PCT/JP2011/006145, 4 pages.

Motorola, "Views on SRS Enhancements for LTE-A," R1-101134, 3GPP TSG RAN WG1 Meeting #60, Agenda Item: 7.4.2, San Francisco, USA, Feb. 22-26, 2010, pp. 1-4.

Motorola, "On Dynamic Aperiodic SRS Transmission Timing," R1-105632, 3GPP TSG RAN WG1 Meeting #62bis, Agenda Item: 6.5.2.1, Xi'an, China, Oct. 11-15, 2010, pp. 1-2.

Nokia Siemens Networks, Nokia, "Channel sounding enhancements for LTE-Advanced uplink,"R1-101438, 3GPP TSG RAN WG1 Meeting #60, Agenda Item: 7.4.2, San Francisco, USA, Feb. 22-26, 2010, 3 pages.

Samsung, "SRS Transmission in LTE-A," R1-094576, 3GPP TSG RAN WG1 #59, Agenda Item: 7.4.2, Jeju, Korea, Nov. 9-13, 2009, pp. 1-3.

Taiwanese Search Report dated Nov. 11, 2015, for corresponding TW Application No. 101103048, 2 pages. [With English Abstract].

Extended European Search Report, dated May 30, 2017, for corresponding European Application No. 11842031.4-1870 / 2642810, 7 pages.

\* cited by examiner

COMMUNICATION DEVICE AND SRS TRANSMISSION CONTROL METHOD

BACKGROUND

Technical Field

The present invention relates to a communication apparatus and an SRS transmission control method.

Description of the Related Art

3rd Generation Partnership Project Radio Access Network Long Term Evolution (3GPP-LTE) (hereinafter, referred to as "LTE") employs Orthogonal Frequency Division Multiple Access (OFDMA) as the downlink communication scheme and employs Single Carrier Frequency Division Multiple Access (SC-FDMA) as the uplink communication scheme (see, Non-Patent Literatures (hereinafter, abbreviated as NPL) 1, 2 and 3, for example). In addition, a Periodic Sounding Reference signal (P-SRS) is used in the uplink of LTE as a reference signal for measuring uplink reception quality.

In order for terminals to transmit the P-SRS to a base station, an SRS transmission subframe shared by all terminals (hereinafter, referred to as "common SRS subframe") is configured. This common SRS subframe is defined by a combination of a predetermined periodicity and a subframe offset on a per cell basis. The information about the common SRS subframe is broadcasted to the terminals in the cell. For example, when the periodicity is 10 subframes, and the offset is 3, a third subframe in a frame (formed of 10 subframes) is configured as a common SRS subframe. In the common SRS subframe, all the terminals in the cell stop the transmission of data signals at the last SC-FDMA symbol of the subframe and use this period as a transmission resource for reference signals.

In addition, each terminal is specifically configured with an SRS transmission subframe by a higher layer (RRC layer above the physical layer) (hereinafter, referred to as "specific SRS subframe"). Each terminal transmits a P-SRS in the configured specific SRS subframe. In addition, each terminal is configured with parameters on the SRS resource (hereinafter, may be referred to as "SRS resource parameter") and also notified of the parameter. The parameters on the SRS resource include the bandwidth and band position of the SRS (or position where SRS band starts), Cyclic Shift, Comb (which corresponds to identification information on the subcarrier group), and/or the like. The terminal transmits an SRS using the resource in accordance with the notified parameters. In addition, SRS frequency hopping may be configured in some cases.

In addition, the introduction of a dynamic aperiodic SRS (hereinafter, referred to as "A-SRS") into the uplink of LTE-Advanced, which is an advanced version of LTE (hereinafter, referred to as "LTE-A"), has been discussed. The transmission timing of an A-SRS is controlled by trigger information (e.g., 1-bit information). This trigger information is transmitted to a terminal from a base station on a physical layer control channel (i.e., PDCCH) (e.g., see NPL 4). More specifically, the terminal transmits an A-SRS only in response to an A-SRS transmission request made by the trigger information (i.e., A-SRS transmission request). In addition, studies have been carried out on defining, as the A-SRS transmission timing, the first common SRS subframe located at or after a k-th subframe (e.g., k=4) from the subframe in which the trigger information is transmitted. As described above, although a P-SRS is transmitted periodically, it is possible to cause a terminal to transmit an A-SRS frequently within a short period only during a data burst in the uplink transmission, for example.

Moreover, LTE-A provides control information formats for various types of data assignment reporting. The control information formats in the downlink include: DCI format 1A for allocation of resource blocks consecutive in number (Virtual RBs or Physical RBs); DCI format 1, which allows allocation of RBs not consecutive in number (hereinafter, referred to as "non-contiguous bandwidth allocation"); DCI formats 2 and 2A for assigning a spatial-multiplexing MIMO transmission; a downlink assignment control information format for assigning a beam-forming transmission ("beam-forming assignment downlink format:" DCI format 1B); and a downlink assignment control information format for assigning a multi-user MIMO transmission ("multi-user MIMO assignment downlink format:" DCI format 1D), and/or the like. Meanwhile, the uplink assignment formats include DCI format 0 for assigning a single antenna port transmission and DCI format 4 for assigning an uplink spatial-multiplexing MIMO transmission. DCI format 4 is used for only terminals configured with an uplink spatial-multiplexing MIMO transmission.

In addition, DCI format 0 and DCI format 1A are adjusted in size by padding so that each format consists of the same number of bits. DCI format 0 and DCI format 1A are also called DCI format 0/1A in some cases. DCI formats 1, 2, 2A, 1B and 1D are used depending on the downlink transmission mode configured for each terminal (i.e., non-contiguous bandwidth allocation, spatial-multiplexing MIMO transmission, beam-forming transmission or multi-user MIMO transmission) and are configured for each terminal. Meanwhile, DCI format 0/1A can be used independently of the transmission mode and thus can be used for terminals in any transmission mode, i.e., DCI format 0/1A is a format commonly usable in all terminals. In addition, when DCI format 0/1A is used, single-antenna transmission or transmit diversity is used as the default transmission mode.

A terminal receives DCI format 0/1A, and the DCI formats that are dependent on the downlink transmission mode. In addition, a terminal configured with an uplink spatial-multiplexing MIMO transmission receives DCI format 4 in addition to the abovementioned DCI formats.

The use of DCI format 0 and DCI format 4, which are control information formats used for uplink data (PUSCH) assignment reporting, for reporting the A-SRS trigger information has been discussed. The field for reporting an A-SRS trigger is added to DCI format 0 in addition to an RB reporting field, MCS reporting field, HARQ information reporting field, transmission power control command reporting field and terminal ID field. In addition to the fields described above, DCI format 4 includes an MCS reporting field for the second transport block (data codeword) to be spatially multiplexed, and precoding information for spatial multiplexing.

The DCI described above is transmitted to a base station to a terminal via a PDCCH. The base station in this case assigns a plurality of terminals to a single subframe, so that the base station simultaneously transmits a plurality of PDCCHs using different resources. The base station transmits the PDCCHs while including CRC bits which have been masked (or scrambled) using the terminal ID of the transmission destination in each of the PDCCHs in order to identify the terminal of the transmission destination of each of the PDCCHs. Each terminal then detects the PDCCH intended for the terminal by blind-decoding the PDCCHs by demasking (or descrambling) CRC bits with the terminal ID of the terminal in the PDCCHs which may have been transmitted for the terminal.

CITATION LIST

Non-Patent Literatures

NPL 1
3GPP TS 36.211 V8.7.0, "Physical Channels and Modulation (Release 8)," September 2008
NPL 2
3GPP TS 36.212 V8.7.0, "Multiplexing and channel coding (Release 8)," September 2008
NPL 3
3GPP TS 36.213 V8.7.0, "Physical layer procedures (Release 8)," September 2008
NPL 4
3GPP TSG RAN WG1 meeting, R1-105632, "On Dynamic Aperiodic SRS Transmission Timing," October 2010

BRIEF SUMMARY

Technical Problem

As described above, a terminal transmits an A-SRS in the first common SRS subframe located at or after a k-th subframe (e.g., k=4) from the subframe in which the terminal receives the trigger information. More specifically, let us suppose a case where the periodicity of common SRS subframes is equal to Np subframes. In this case, when receiving an A-SRS trigger during a period from a subframe located Np+k+1 subframes before a certain common SRS subframe until a subframe located k subframes before the common SRS subframe among Np subframes, the terminal uses the common SRS subframe to transmit an A-SRS. Stated differently, when requesting a terminal to transmit an A-SRS in subframe n, which is a common SRS subframe, the base station notifies the terminal of the A-SRS transmission request by the A-SRS trigger information during a period from a subframe corresponding to subframe n−(Np+k+1) until a subframe corresponding to subframe n−k among Np subframes (hereinafter, referred to as "effective period").

At least two kinds of DCI formats, which are DCI format 0 and DCI format 4, can be used for an A-SRS transmission request. A base station can request each terminal to transmit an A-SRS of a different A-SRS configuration (e.g., A-SRS bandwidth, cyclic shift, Comb, the number of antennas and/or the like) using each of the DCI formats.

Meanwhile, each terminal detects the DCI intended for the terminal by blind-decoding PDCCHs. For this reason, a terminal may erroneously detect DCI that is intended for a different terminal or DCI that has not been transmitted. Such erroneous detection of DCI is called a "false alarm" or "false detection" and means that DCI intended for a different terminal or a signal that has not been transmitted intentionally (i.e., noise components) is erroneously detected as the DCI intended for the terminal. Each terminal makes CRC judgment for a plurality of PDCCH resource candidates after demasking the CRC part of each PDCCH using the terminal ID of the terminal (i.e., blind-decoding). During the blind-decoding, when the result of CRC is OK, the terminal detects the DCI as being intended for the terminal regardless of whether or not the bit sequence is actually correct or is intended for the terminal. For example, even when nothing is actually transmitted on the blind-decoding target PDCCH resource, the terminal blind-decodes noise components as a signal. In this case, a random bit sequence appears as the decoding result, and the result of CRC becomes OK depending on the combination of bits.

In addition, a base station may intentionally or unintentionally reports a plurality of A-SRS transmission requests within an effective period. Accordingly, there is a possibility for a terminal to detect a plurality of A-SRS transmission requests within an effective period for a certain common SRS subframe.

However, no studies have been carried out on the operation of terminals upon detection of a plurality of A-SRS transmission requests. For this reason, there is a concern that a base station may perform an erroneous reception quality measurement as a result of different understanding of A-SRS configuration between the base station and the terminal. In addition, the terminal may unnecessarily interfere with a different cell in this case. In particular, A-SRS transmission performed by a terminal using an SRS resource allocated to a different terminal affects not only the reception quality measurement of the terminal but also the reception quality measurement of the different terminal, thus possibly degrading the system throughput.

It is an object of the present invention to provide a communication apparatus and an SRS transmission method each of which is capable of preventing degradation in the system throughput by reducing the possibility of occurrence of a difference in understanding of the presence or absence of SRS transmission or understanding of an SRS resource between the SRS transmission side and reception side.

Solution to Problem

A communication apparatus according to an aspect of the present invention includes: a detection section that detects control information indicating whether or not to request transmission of a sounding reference signal (SRS); and a control section that controls the transmission of the SRS based on the detected control information, in which, when detecting a plurality of pieces of the control information within a predetermined period, the control section controls the transmission of the SRS based on a piece of the control information that is detected first.

A communication apparatus according to an aspect of the present invention includes: a detection section that detects control information indicating whether or not to request transmission of a sounding reference signal (SRS); and a control section that controls the transmission of the SRS based on the detected control information, in which, when detecting a plurality of pieces of the control information within a predetermined period, the control section controls the transmission of the SRS based on a piece of the control information that is detected last.

A communication apparatus according to an aspect of the present invention includes: a detection section that detects control information indicating whether or not to request transmission of a sounding reference signal (SRS); and a control section that controls the transmission of the SRS based on the detected control information, in which, when detecting a plurality of pieces of the control information within a predetermined period, the control section performs control in such a way that the SRS is not transmitted.

A communication apparatus according to an aspect of the present invention includes: a detection section that detects control information indicating whether or not to request transmission of a sounding reference signal (SRS); and a control section that controls the transmission of the SRS based on the detected control information, in which, when detecting a plurality of different pieces of the control information within a predetermined period, the control section performs control in such a way that the SRS is not transmitted.

A communication apparatus according to an aspect of the present invention includes: a detection section that detects control information indicating whether or not to request transmission of a sounding reference signal (SRS); and a control section that controls the transmission of the SRS based on the detected control information, in which, when detecting at least one piece of the control information that requests the transmission of the SRS and subsequently detecting a piece of the control information that requests no transmission of the SRS, within a predetermined period, the control section performs control in such a way that the SRS is not transmitted, and when further detecting, within the predetermined period, at least one piece of the control information that is different from the at least one piece of the control information and that requests the transmission of the SRS, the control section performs control in such a way that the SRS is transmitted, based on the piece of the control information that requests the transmission of the SRS and that is detected last.

A communication apparatus according to an aspect of the present invention includes: a transmission section that transmits control information indicating whether or not to request transmission of a sounding reference signal (SRS) to a communication counterpart; and a detection section that detects the SRS transmitted at a predetermined timing based on the control information from the communication counterpart, in which the transmission section transmits only one piece of the control information before the predetermined timing within a predetermined period.

A communication apparatus according to an aspect of the present invention includes: a transmission section that transmits control information indicating whether or not to request transmission of a sounding reference signal (SRS) to a communication counterpart; and a detection section that detects the SRS transmitted at a predetermined timing based on the control information from the communication counterpart, in which the transmission section transmits identical pieces of the control information when transmitting a plurality of pieces of the control information to the communication counterpart before the predetermined timing within a predetermined period.

An SRS transmission control method according to an aspect of the present invention includes: detecting control information indicating whether or not to request transmission of a sounding reference signal (SRS); and controlling the transmission of the SRS based on the detected control information and a predetermined rule when a plurality of pieces of the control information is detected before a predetermined timing at which the SRS is transmitted within a predetermined period, or a plurality of pieces of the control information is detected within the predetermined period.

Advantageous Effects of Invention

According to the present invention, it is possible to provide a communication apparatus and an SRS transmission method each of which is capable of preventing degradation in the system throughput by reducing the possibility of occurrence of a difference in understanding of the presence or absence of SRS transmission or understanding of an SRS resource between the SRS transmission side and reception side.

DETAILED DESCRIPTION

Figure 1:
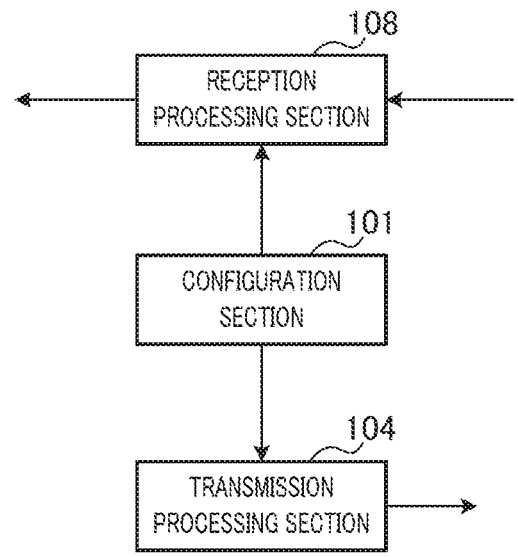
FIG. 1 is a main configuration diagram of a base station according to Embodiment 1 of the present invention.

Hereinafter, embodiments of the present invention will be described in detail with reference to the drawings. Throughout the embodiments, the same elements are assigned the same reference numerals and any duplicate description of the elements is omitted.

Embodiment 1

Overview of Communication System

A communication system according to Embodiment 1 of the present invention includes base station 100 and terminals 200. Base station 100 is an LTE-A compliant base station and each terminal 200 is an LTE-A compliant terminal.

FIG. 1 is a main configuration diagram of base station 100 according to Embodiment 1 of the present invention. In base station 100, transmission processing section 104 transmits control information indicating whether or not to request a sounding reference signal (SRS) transmission to terminal 200, and reception processing section 108 detects an SRS transmitted from terminal 200 at a predetermined timing based on the control information. In Embodiment 1, configuration section 101 controls the transmission of a transmission request, and only one piece of control information is transmitted within an effective period. Base station 100 instructs terminal 200 to transmit an SRS, using an A-SRS transmission request transmitted from transmission processing section 104.

Figure 2:
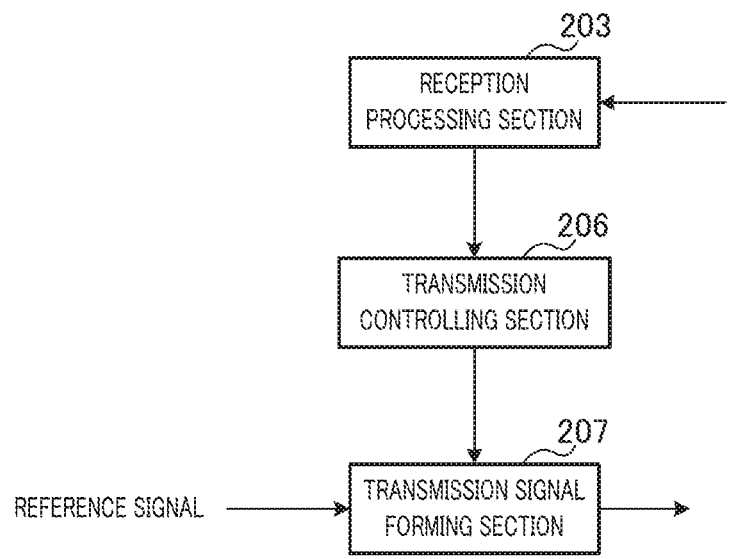
FIG. 2 is a main configuration diagram of a terminal according to Embodiment 1 of the present invention.

FIG. 2 is a main configuration diagram of terminal 200 according to Embodiment 1 of the present invention. In terminal 200, reception processing section 203 detects control information indicating whether or not transmission of a sounding reference signal (SRS) is requested, and transmission signal forming section 207 transmits an A-SRS under the control of transmission controlling section 206 based on the control information. Transmission controlling section 206 determines whether or not to perform SRS transmission on the basis of an "SRS transmission execution rule" and the reception condition of trigger information.

Hereinafter, a description will be provided on an FDD system in which the uplink and downlink are separated in the frequency domain.

(Configuration of Base Station 100)

Figure 3:
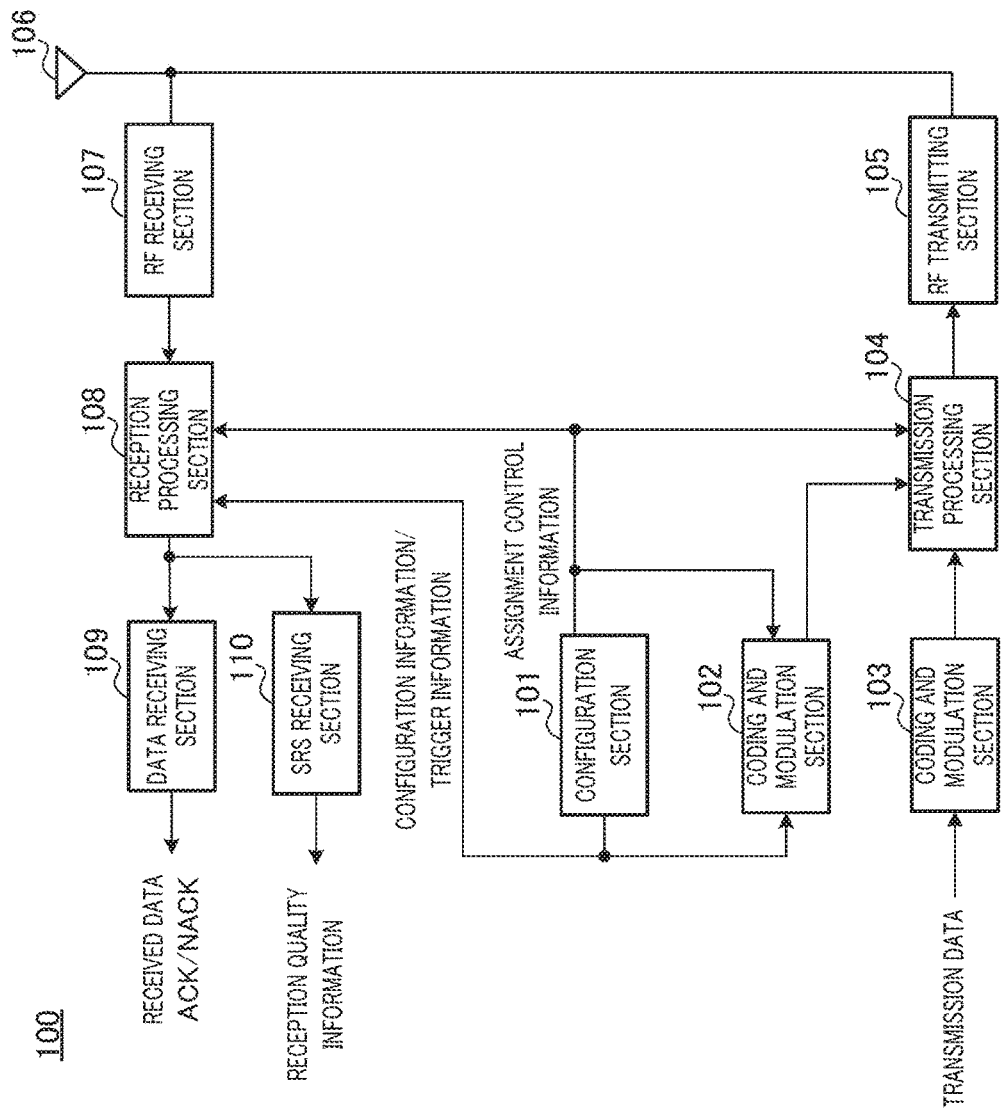
FIG. 3 is a block diagram of the base station according to Embodiment 1 of the present invention.

FIG. 3 is a block diagram illustrating a configuration of base station 100 according to Embodiment 1 of the present invention. In FIG. 3, base station 100 includes configuration section 101, coding and modulation sections 102 and 103, transmission processing section 104, RF transmitting section 105, antenna 106, RF receiving section 107, reception processing section 108, data receiving section 109, and SRS receiving section 110.

Configuration section 101 generates "A-SRS transmission rule configuration information" for configuring configuration target terminal 200 with correspondence between control information formats (DCI formats) used for requesting A-SRS transmission and resources used by configuration target terminal 200 for the A-SRS transmission (i.e., A-SRS resource). The A-SRS transmission rule configuration information includes identification information for a plurality of control information formats (DCI formats) and information about the A-SRS resource corresponding to the identification information on each of the control information formats. This A-SRS resource is a resource for configuration target terminal 200 to map an A-SRS as described above. The information about the A-SRS resource includes parameters for configuration target terminal 200 to transmit an A-SRS, such as the frequency band (or RB position where the SRS band starts), frequency bandwidth (or the number of RBs), Cyclic Shift, transmission Comb, the number of antennas, the number of times the transmission is to be performed, frequency hopping, and component carrier. More specifically, configuration target terminal 200 is configured with a combination of the identification information on each of a plurality of control information formats (DCI formats) and the abovementioned parameters corresponding to the identification information on a corresponding one of the control information formats by the A-SRS transmission rule configuration information. The A-SRS resources in accordance with the number of bits used as the trigger information for the DCI formats (i.e., the number of A-SRS resource candidates that can be reported using the trigger information) are associated respectively with bit states that can be expressed by the number of bits. In the case of 1 bit, for example, one bit state is used to report "no SRS transmission request," so that the number of resource types that can be reported is limited to only one. For this reason, the other bit state is associated with resource A. In the case of 2 bits, three resource types can be reported, so that three bit states are associated with three resources B, C, and D, respectively.

Configuration section 101 generates uplink assignment control information or downlink assignment control information that includes trigger information requesting an A-SRS transmission for configuration target terminal 200 (hereinafter, simply referred to as "trigger information").

The A-SRS transmission rule configuration information generated by configuration section 101 in the manner described above is subjected to transmission processing as control information of the RRC layer in coding and modulation section 102, transmission processing section 104, and RF transmitting section 105 and thereafter transmitted to configuration target terminal 200. The control information including trigger information for A-SRS transmission is subjected to transmission processing in coding and modulation section 102, transmission processing section 104, and RF transmitting section 105 as control information of layers 1 and 2 and thereafter transmitted to configuration target terminal 200. When the trigger information consists of 1 bit (e.g., DCI format 0), the bit value "0" indicates an A-SRS transmission request using resource A, and the bit value "1" indicates no A-SRS transmission request. When the trigger information consists of 2 bits (e.g., DCI format 4), among four bit states, state 1 indicates no A-SRS transmission request, and states 2, 3 and 4 indicate an A-SRS transmission request using resources B, C, and D, respectively. Configuration section 101 configures resources A, B, C and D.

Configuration section 101 generates assignment control information including trigger information, resource (RB) allocation information, and MCS information for one or more transport blocks (TBs) The assignment control information may be assignment control information on an uplink resource for assigning uplink data (e.g., Physical Uplink Shared Channel (PUSCH)) or on a downlink resource for assigning downlink data (e.g., Physical Downlink Shared Channel (PDSCH)). The assignment control information for assigning uplink data includes DCI formats 0 and 4, and the assignment control information for assigning downlink data includes DCI format 1A, 1, 1B, 1D, 2, 2A and/or the like.

Configuration section 101 generates control information including trigger information indicating a transmission request to a terminal in order that the control information can be transmitted within the effective period corresponding to the subframe in which the terminal is caused to transmit an A-SRS. Embodiment 1 assumes that base station 100 transmits control information including trigger information indicating an SRS transmission request to one target terminal only once within a single effective period.

Configuration section 101 transmits the A-SRS transmission rule configuration information to configuration target terminal 200 via coding and modulation section 102 and also outputs the information to reception processing section 108. Configuration section 101 transmits the assignment control information including trigger information to configuration target terminal 200 via coding and modulation section 102 and also outputs the information to transmission processing section 104. Configuration section 101 outputs information indicating the format of the assignment control information including trigger information to reception processing section 108.

The configuration information is reported to terminal 200 from base station 100 as higher layer information (i.e., via RRC signaling). Meanwhile, the assignment control information (including trigger information) is reported to terminal 200 from base station 100 using Physical Downlink Control Channel (PDCCH). Specifically, the reporting intervals for the configuration information are relatively long (i.e., reported between relatively long intervals) while the reporting intervals for the assignment control information are relatively short (i.e., reported between relatively short intervals).

Coding and modulation section 102 encodes and modulates the configuration information and assignment control information received from configuration section 101 and outputs the resultant modulation signal to transmission processing section 104.

Coding and modulation section 103 encodes and modulates data signals to be received and outputs the obtained modulation signal to transmission processing section 104.

Transmission processing section 104 maps the modulation signals to be received from coding and modulation sections 102 and 103 to the resource indicated by the resource allocation information to be received from configuration section 101, thereby forming a transmission signal. For this processing, when the transmission signal is an OFDM signal, the modulation signal is mapped to the resource indicated by the downlink resource allocation information to be received from configuration section 101, then transforms the signal into a time waveform by inverse fast Fourier transform (IFFT) processing, and adds a cyclic prefix (CP) to the resultant signal, thereby forming an OFDM signal.

RF transmitting section 105 performs radio transmission processing (such as up-conversion and digital to analog (D/A) conversion) on the transmission signal to be received from transmission processing section 104.

RF receiving section 107 performs radio reception processing (such as down-conversion and analog to digital (A/D) conversion) and outputs the resultant received signal to reception processing section 108.

Reception processing section 108 identifies the resource to which the uplink data signal and ACK/NACK information are mapped, on the basis of the uplink resource allocation information received from configuration section 101 and extracts signal components mapped to the identified resource from the received signal.

In addition, reception processing section 108 identifies the resource to which an A-SRS is mapped, on the basis of the A-SRS transmission rule configuration information, trigger information, and the information on the DCI format used for the A-SRS transmission request received from configuration section 101 and extracts signal components mapped to the identified resource from the received signal. More specifically, reception processing section 108 receives the A-SRS on the identified resource in the first common SRS subframe located at or after a k-th subframe (k=4 in this case) from the subframe in which the trigger information is transmitted.

When the received signal is a spatially multiplexed signal (i.e., transmitted by a plurality of codewords (CWs)), reception processing section 108 demultiplexes the received signals for each CW. In addition, when the received signal is an OFDM signal, reception processing section 108 transforms the received signal into a time-domain signal by performing inverse discrete Fourier transform (IDFT) processing on the extracted signal components.

The uplink data signal and ACK/NACK information extracted by reception processing section 108 as described above are outputted to data receiving section 109, and the A-SRS signal is outputted to SRS receiving section 110.

Data receiving section 109 decodes the signal received from reception processing section 108. Thus, the uplink data and ACK/NACK information are obtained.

SRS receiving section 110 measures the reception quality of each frequency resource on the basis of the A-SRS signal received from reception processing section 108 and outputs the reception quality information. When a plurality of A-SRS signals transmitted from different terminals 200 are code-multiplexed using an orthogonal sequence and/or the like, SRS receiving section 110 performs demultiplexing processing on the code-multiplexed A-SRS signals.

(Configuration of Terminal 200)

Figure 4:
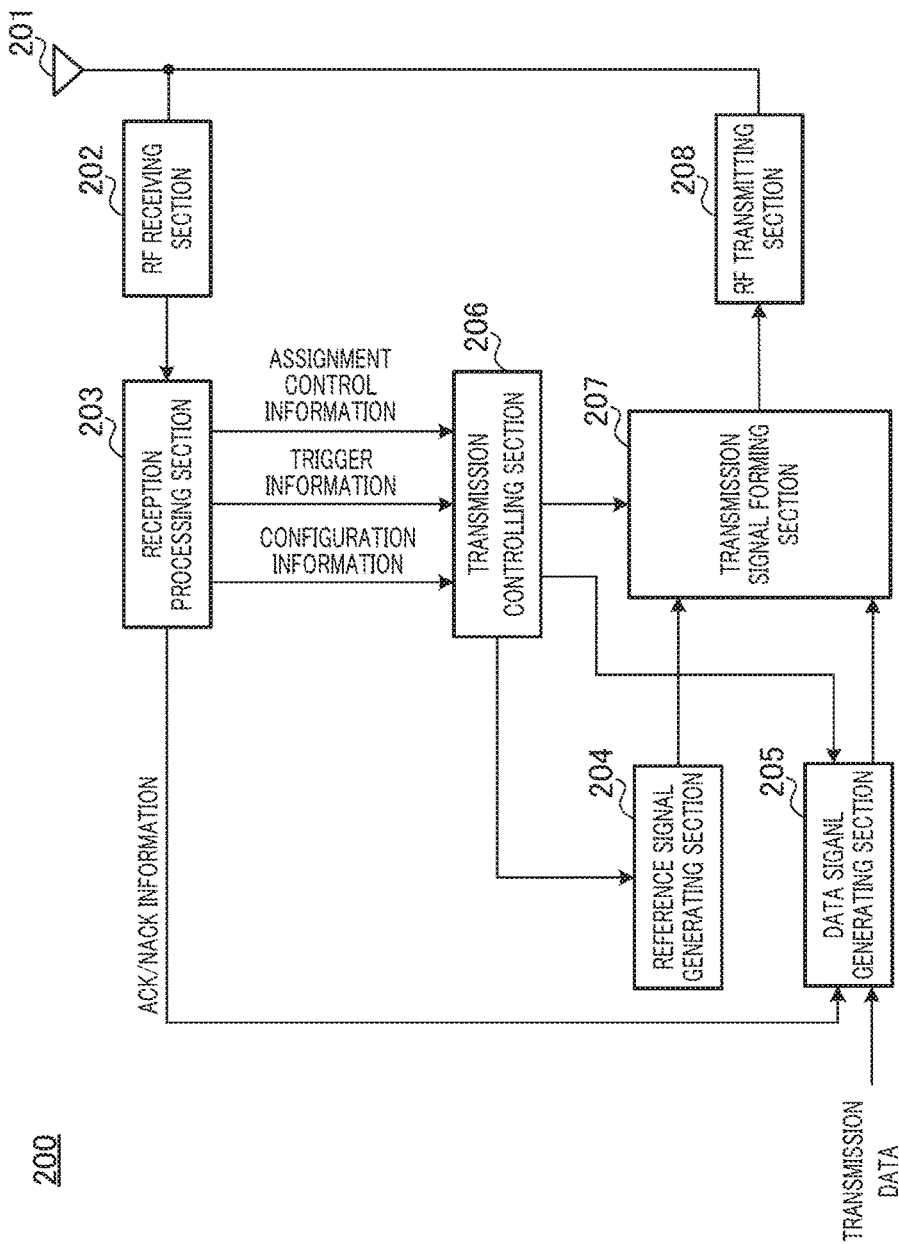
FIG. 4 is a block diagram of the terminal according to Embodiment 1 of the present invention.

FIG. 4 is a block diagram illustrating a configuration of terminal 200 according to Embodiment 1 of the present invention. Terminal 200 is an LTE-A compliant terminal in Embodiment 1.

In FIG. 4, terminal 200 includes antenna 201, RF receiving section 202, reception processing section 203, reference signal generating section 204, data signal generating section 205, transmission controlling section 206, transmission signal forming section 207, and RF transmitting section 208.

RF receiving section 202 performs radio receiving processing (such as down-conversion and analog to digital (A/D) conversion) on the radio signal received via antenna 201 and outputs the resultant received signal to reception processing section 203.

Reception processing section 203 extracts the configuration information, assignment control information, and data signal in the received signal. Reception processing section 203 outputs the configuration information and assignment control information to transmission controlling section 206. In addition, reception processing section 203 outputs the DCI format identification information of the assignment control information in which the trigger information has been included to transmission controlling section 206. Reception processing section 203 performs error detection processing on the extracted data signal and outputs ACK/NACK information in accordance with the result of error detection to data signal generating section 205. Reception processing section 203 detects DCI by blind-decoding and extracts the assignment control information from the detected DCI.

Reference signal generating section 204 generates a reference signal upon reception of an instruction to generate a reference signal from transmission controlling section 206 and outputs the reference signal to transmission signal forming section 207.

Data signal generating section 205 takes the ACK/NACK information and transmission data as input and generates a data signal by encoding and modulating the ACK/NACK information and transmission data on the basis of MCS information to be received from transmission controlling section 206. In the case of Non-MIMO transmission, a data signal is generated by single codeword (CW), while a data signal is generated by two codewords in the case of MIMO. When the received signal is an OFDM signal, data signal generating section 205 performs CP removal processing and FFT processing.

Transmission controlling section 206 determines whether or not to perform SRS transmission, on the basis of the "SRS transmission execution rule" and the reception condition of the trigger information. The "SRS transmission execution rule" in Embodiment 1 indicates that an SRS is transmitted in accordance with the assignment control information that includes the trigger information indicating a transmission request and that is detected first within an effective period. More specifically, upon detection of trigger information indicating a transmission request for a common SRS subframe of subframe number n, once, transmission controlling section 206 disregards trigger information and assignment control information included in DCI even when detecting DCI including trigger information indicating a transmission request after the detection of the first trigger information within the effective period in which an A-SRS of subframe number n can be requested (i.e., during a period from subframe n−(Np+k+1) until subframe n−k).

When determining to perform SRS transmission, transmission controlling section 206 configures a resource for terminal 200 to map an A-SRS signal. Specifically, transmission controlling section 206 identifies the resource on the basis of the configuration information (A-SRS transmission rule configuration information), and DCI format identification information of the assignment control information in which the trigger information has been included, which are to be received from reception processing section 203. In addition, when multiple bits are included as trigger information, SRS resource reporting information included in the trigger information is used for identifying the resource.

Transmission controlling section 206 configures the first common SRS subframe located at or after a k-th subframe from the subframe in which the assignment control information including the trigger information is transmitted, to be the transmission subframe for an A-SRS. Upon receipt of the trigger information, transmission controlling section 206 outputs an instruction to generate a reference signal to reference signal generating section 204 and outputs information about the identified SRS resource to transmission signal forming section 207.

Transmission controlling section 206 identifies a "data mapping resource" to which the data signal is mapped, on the basis of the assignment control information to be received from reception processing section 203 and outputs information about the data mapping resource (hereinafter, referred to as "data mapping resource information") to transmission signal forming section 207 and also outputs MCS information included in the assignment control information to data signal generating section 205.

Transmission signal forming section 207 maps the A-SRS signal to be received from reference signal generating section 204 to the SRS mapping resource. Transmission signal forming section 207 maps the data signal to be received from data signal generating section 205 to the data mapping resource indicated by the data mapping resource information. The transmission signal is formed in the manner described above. In the case of Non-MIMO transmission, a single codeword data signal is assigned to a single layer, while a two codeword data signal is assigned to a plurality of layers in the case of MIMO transmission. When the transmission signal is an OFDM signal, transmission signal forming section 207 performs discrete Fourier transform (DFT) processing on the data signal and thereafter maps the processed data signal to the data mapping resource. Meanwhile, a CP is added to the formed transmission signal.

RF transmitting section 208 performs radio transmission processing (such as up-conversion and digital to analog (D/A) conversion) on the transmission signal formed by transmission signal forming section 207 and transmits the processed signal via antenna 201.

(Operation of Base Station 100 and Terminal 200)

A description will be provided with reference to FIG. 5, regarding the operation of base station 100 and terminal 200 configured in the manner described above. This description assumes that the assignment control information of DCI format 0 and DCI format 4 includes trigger information. FIG. 5 describe the processing related to the uplink data assignment and A-SRS transmission request in base station 100 and to the data transmission and A-SRS transmission in terminal 200. The data assignment reporting and data transmission are performed on a per subframe basis.

Figure 5A:
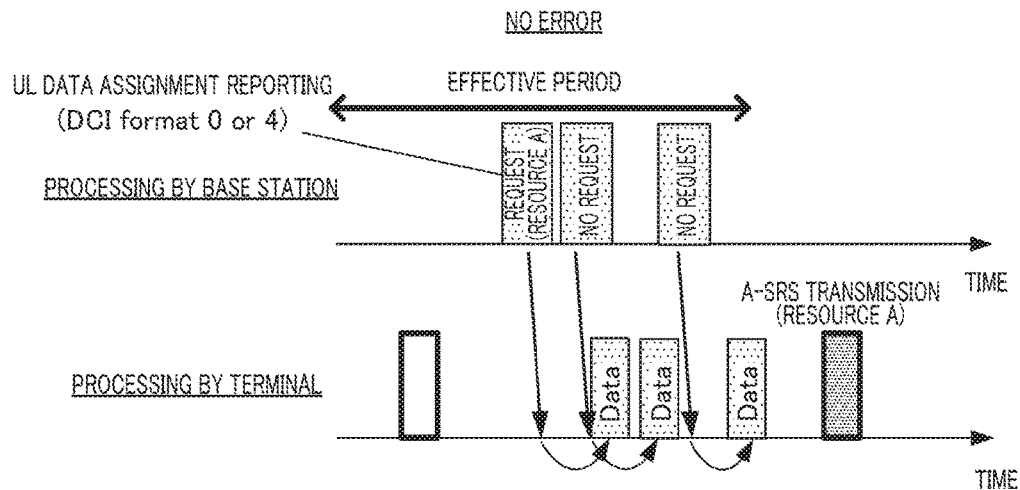
FIGS. 5A-5B are diagrams provided for describing the operation of a base station and a terminal.
Figure 5B:
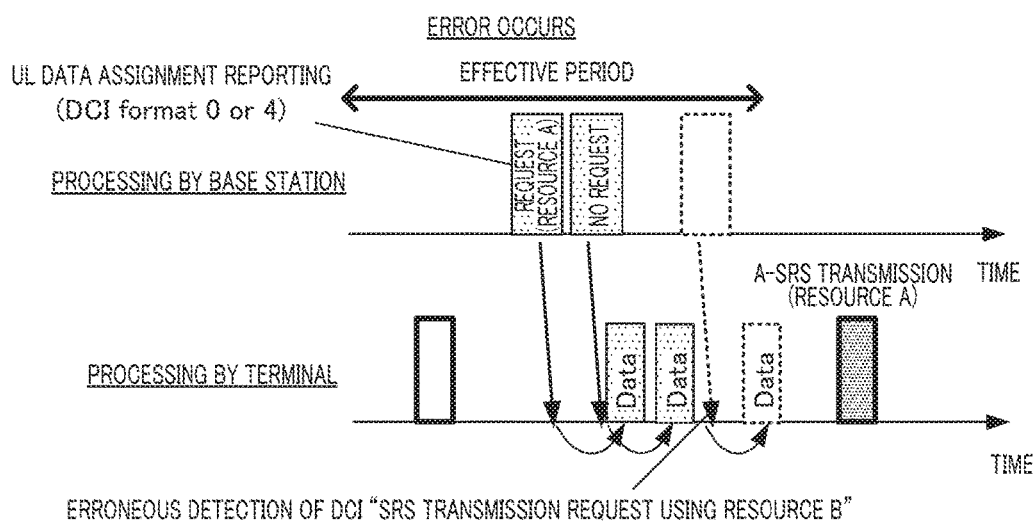

As illustrated in FIG. 5A, base station 100 transmits at most one piece of DCI that includes an A-SRS transmission request to each terminal 200 within an effective period corresponding to one common SRS subframe.

Meanwhile, transmission controlling section 206 determines whether or not to perform SRS transmission on the basis of the "SRS transmission execution rule" and the reception condition of the trigger information in terminal 200. Specifically, the "SRS transmission execution rule" in Embodiment 1 indicates that an SRS is transmitted in accordance with the assignment control information which includes trigger information indicating a transmission request and which is detected first within an effective period. More specifically, even if DCI that includes an A-SRS transmission request is detected after detection of first DCI that includes an A-SRS transmission request within a single effective period, the DCI detected after the first DCI is disregarded. Stated differently, when a plurality of pieces of DCI that include trigger information indicating an A-SRS transmission request are detected within a single effective period, no A-SRS is transmitted on the SRS resource requested by a piece of DCI that includes an A-SRS transmission request and that is detected after the first DCI, but an A-SRS is transmitted on the SRS resource requested by the first piece of DCI that includes an A-SRS transmission request and that is detected first (see, FIG. 5B).

The control of SRS transmission according to the "SRS transmission execution rule" described above makes it possible to reduce the probability of terminal 200 erroneously detecting DCI or the probability of terminal 200 transmitting an A-SRS using an SRS resource different from an SRS resource requested by base station 100, due to erroneous detection of A-SRS trigger information. In this situation, when terminal 200 erroneously detects DCI that includes an A-SRS transmission request before base station 100 transmits DCI that includes an A-SRS transmission request, terminal 200 wrongly transmits an A-SRS. However, when base station 100 reports an A-SRS transmission request using an earliest possible subframe within an effective period, the probability of terminal 200 erroneously detecting DCI before base station 100 reports an A-SRS transmission request within the effective period can be reduced. In addition, this configuration provides an advantage in that the processing of terminal 200 becomes very simple because terminal 200 needs to prepare for A-SRS transmission only according to the first trigger information.

When detecting a different piece of DCI that includes an A-SRS transmission request after detecting a first piece of DCI that includes an A-SRS transmission request within a single effective period, terminal 200 may treat data assignment according to the different piece of DCI (i.e., information about data assignment such as data RBs, MCS, transmission power control, and/or the like) as valid information and disregards only the A-SRS trigger information included in the different piece of DCI. Specifically, the assignment reporting information on the data assignment and the A-SRS trigger information in a piece of DCI may be treated, independently. In this case, no A-SRS is transmitted using the SRS resource indicated by the DCI that includes an A-SRS transmission request and that is detected after the first DCI, but an A-SRS is transmitted using the SRS resource requested by the DCI that includes an A-SRS transmission request and that is detected first within a single effective period, while uplink data (PUSCH) is transmitted according to the data assignment information indicated by the DCI that includes an A-SRS transmission request and that is detected after the first DCI. Stated differently, the information other than the A-SRS trigger information in the information included in the assignment reporting information in DCI (i.e., RB allocation, MCS reporting information, and/or the like) is treated as valid regardless of the state of any A-SRS trigger information detected before the DCI, and the A-SRS trigger information detected before the DCI is determined to be valid or invalid depending on the presence or absence of the A-SRS trigger information detected before the DCI.

The A-SRS and A-SRS trigger information are newly introduced in LTE-Advanced. Meanwhile the assignment reporting information other than A-SRS trigger information in DCI is already defined in LTE. Specifically, the processing circuit configured to perform the operation relating to the assignment reporting information in DCI has been already implemented in LTE base stations and LTE terminals before LTE-Advanced. Thus, determining validity or invalidity of the assignment reporting information and A-SRS trigger information in a piece of DCI independently makes it possible to continue using the processing circuit that has been already implemented in LTE without any modification as described above. Accordingly, the man-hours required for implementation can be reduced since it requires only addition of the processing part corresponding to the A-SRS related part.

Embodiment 2

In Embodiment 2, the "SRS transmission execution rule" indicates that an A-SRS is transmitted according to the assignment control information that includes trigger information indicating a transmission request and that is detected last within an effective period. The base station and terminal according to Embodiment 2 are similar to base station 100 and terminal 200 according to Embodiment 1 in their basic configurations, so that Embodiment 2 will be described with reference to FIGS. 3 and 4.

In base station 100 according to Embodiment 2, configuration section 101 generates DCI that includes trigger information indicating an A-SRS transmission request in one or more subframes within an effective period for each terminal 200. Specifically, base station 100 according to Embodiment 2 is capable of reallocating an A-SRS resource to each terminal 200 within an effective period corresponding to a certain common SRS subframe in accordance with the A-SRS assignment state for a plurality of terminals 200 in the common SRS subframe.

In terminal 200 according to Embodiment 2, transmission controlling section 206 determines whether or not to perform SRS transmission on the basis of the "SRS transmission execution rule" and the reception condition of trigger information. The "SRS transmission execution rule" in Embodiment 2 indicates that an A-SRS is transmitted according to the assignment control information that includes trigger information indicating a transmission request and that is detected last within an effective period. Specifically, when detecting a first piece of DCI that includes trigger information indicating a transmission request in an effective period corresponding to a common SRS subframe of subframe number n and detecting a different piece of DCI that includes trigger information indicating a transmission request in a different subframe transmitted after the subframe in which the first piece of DCI is detected (i.e., during a period from the initial detection timing until a subframe corresponding to subframe n-k) in the same period, transmission controlling section 206 overwrites the information about the SRS resource indicated by the previous trigger information with the information about the SRS resource indicated by the trigger information in the piece of DCI detected this time. Accordingly, transmission controlling section 206 can hold the latest information about the SRS resource in each effective period. Transmission controlling section 206 outputs an instruction to generate a reference signal to reference signal generating section 204 and also outputs the updated information about the SRS resource to transmission signal forming section 207 in accordance with the result of overwriting the information.

Figure 6A:
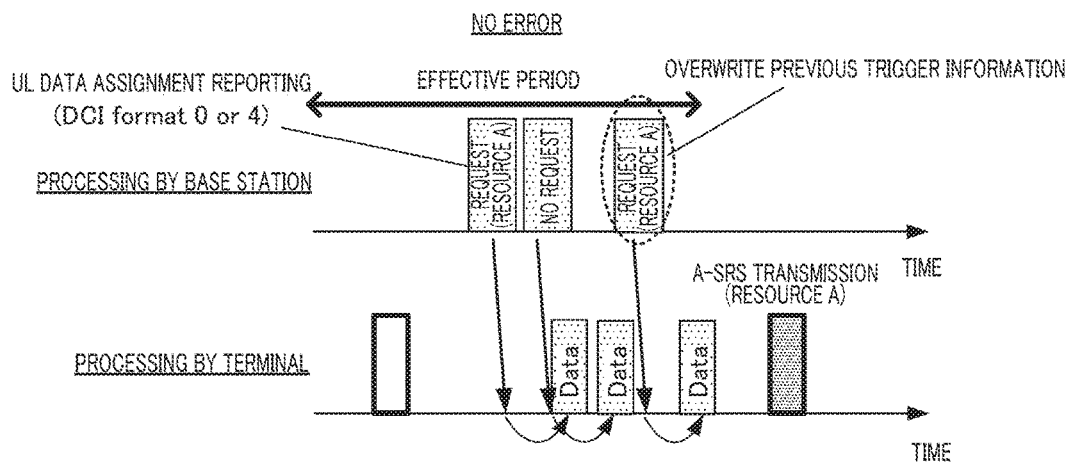
FIGS. 6A-6B are diagrams provided for describing the operation of a base station and a terminal according to Embodiment 2 of the present invention.
Figure 6B:
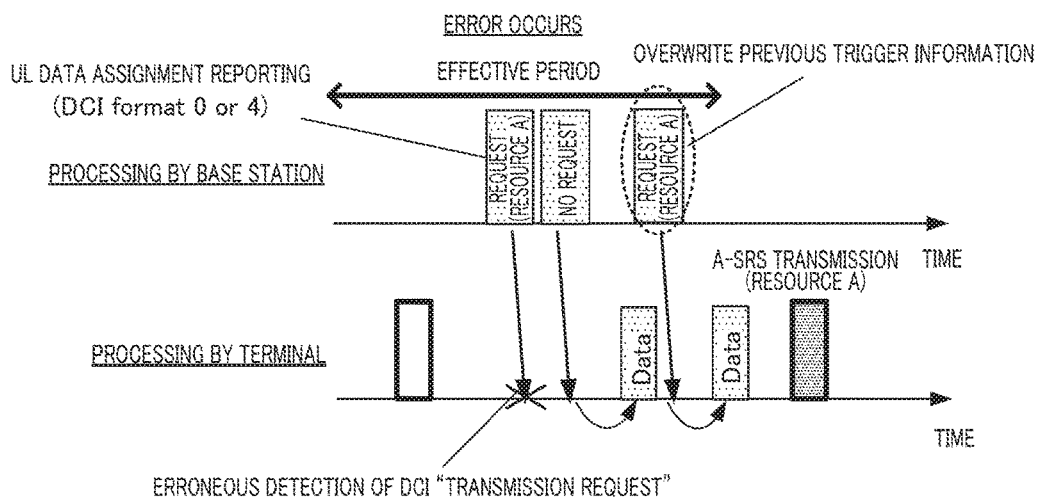

The operation of base station 100 and terminal 200 according to Embodiment 2, which are configured in the manner described above, will be described with reference to FIG. 6. In FIGS. 6A and 6B, base station 100 transmits DCI that includes trigger information indicating an A-SRS transmission request in one subframe and also transmits DCI that includes trigger information indicating an A-SRS transmission request in a subsequent subframe in a single effective period.

In FIG. 6A, terminal 200 correctly detects all pieces of DCI and receives trigger information indicating an A-SRS transmission request in two subframes. Terminal 200 then transmits an A-SRS according to the "SRS transmission execution rule" and the assignment control information that includes trigger information indicating a transmission request and that is detected last within the effective period.

In FIG. 6B, terminal 200 fails to detect DCI that includes trigger information indicating an A-SRS transmission request and that is transmitted first within a single effective period. Specifically, terminal 200 fails to recognize that the DCI is intended for terminal 200 because the result of error detection does not indicate OK as a result of the presence of a bit error. In this effective period, however, the DCI that indicates trigger information indicating an A-SRS transmission request and that is transmitted after the DCI that has resulted in detection failure is correctly detected. Thus, terminal 200 transmits an A-SRS according to the A-SRS trigger information included in the correctly detected DCI.

As described above, base station 100 transmits DCI that includes trigger information indicating an A-SRS transmission request in a plurality of subframes within a single effective period, while the transmission of SRS is controlled according to the "SRS transmission execution rule." Thus, terminal 200 can correctly transmit an A-SRS even when failing to detect DCI transmitted during an early stage of the effective period, as long as terminal 200 can detect DCI transmitted after the earlier DCI.

As a result, base station 100 can measure appropriate channel quality.

In addition, base station 100 can change an SRS resource by transmitting a plurality of pieces of trigger information within an effective period. Specifically, base station 100 can request A-SRS transmission to be performed using an SRS resource different from the SRS resource reported by first trigger information, by transmitting second trigger information indicating the different SRS resource, after the first trigger information. For example, when base station 100 needs a certain terminal 200 with higher priority to perform A-SRS transmission using an SRS resource (e.g., resource A) after transmitting an A-SRS transmission request with the same SRS resource (resource A) to a different terminal 200, base station 100 transmits A-SRS trigger information indicating a different SRS resource (e.g., resource B) for overwriting the previously indicated SRS resource. The different SRS resource may be indicated by using a different DCI format or using the same DCI format but reporting a different state of the A-SRS trigger information. As described above, base station 100 can reallocate an SRS resource to terminal 200 by overwriting an SRS resource that has been reported to terminal 200 with a different resource. Accordingly, it is possible to prevent a collision between SRS resources allocated to a plurality of terminals 200.

As described above, when terminal 200 erroneously detects DCI, an A-SRS may be transmitted using a wrong SRS resource. However, when terminal 200 correctly receives DCI that includes trigger information indicating an A-SRS transmission request and that is transmitted in the last subframe within the effective period, terminal 200 does not transmit an A-SRS using a wrong SRS resource. Alternatively, reporting DCI that includes trigger information indicating an A-SRS transmission request from base station 100, using a latest possible subframe in the effective period makes it possible to reduce the probability of terminal 200 erroneously detecting DCI or the probability of terminal 200 transmitting an A-SRS using an SRS resource different from the SRS resource required by base station 100, due to erroneous detection of A-SRS trigger information.

Embodiment 3

In Embodiment 3, the "SRS transmission execution rule" indicates that upon detection of a plurality of pieces of DCI each of which includes trigger information indicating an A-SRS transmission request within an effective period, no A-SRS is transmitted in any common SRS subframe corresponding to the effective period. The base station and terminal according to Embodiment 3 are similar to base station 100 and terminal 200 according to Embodiment 1 in their basic configurations, so that Embodiment 3 will be described with reference to FIGS. 3 and 4.

In base station 100 according to Embodiment 3, configuration section 101 generates DCI that includes trigger information indicating an A-SRS transmission request in one or two subframes within an effective period for each terminal 200. The number of times this trigger information is generated is controlled in accordance with the A-SRS assignment state for a plurality of terminals 200 in a certain common SRS subframe. For example, when base station 100 needs a certain terminal 200 with higher priority to perform A-SRS transmission using an SRS resource (e.g., resource A) after transmitting an A-SRS transmission request using the same SRS resource (resource A) to a different terminal 200, base station 100 transmits A-SRS trigger information indicating an A-SRS transmission request again within the same effective period to cancel the previously made A-SRS transmission request.

In terminal 200 according to Embodiment 3, transmission controlling section 206 determines whether or not to perform SRS transmission on the basis of the "SRS transmission execution rule" and the reception condition of the trigger information. In Embodiment 3, the "SRS transmission execution rule" indicates that upon detection of a plurality of pieces of DCI each of which includes trigger information indicating an A-SRS transmission request within an effective period, no A-SRS is transmitted in any common SRS subframe corresponding to the effective period. Specifically, when transmission controlling section 206 detects first piece of DCI that includes trigger information indicating a transmission request in an effective period corresponding to a common SRS subframe of subframe number n and detecting a different piece of DCI that includes trigger information indicating a transmission request in a different subframe transmitted after the subframe in which the first piece of DCI is detected (i.e., during a period from the initial detection timing until a subframe corresponding to subframe n-k) in the same period, transmission controlling section 206 determines the A-SRS trigger information to be invalid and also invalidates (i.e., cancels) the A-SRS trigger information that is detected before the A-SRS trigger information. In this case, transmission controlling section 206 outputs an instruction to cancel the instruction to generate a reference signal to reference signal generating section 204.

Figure 7A:
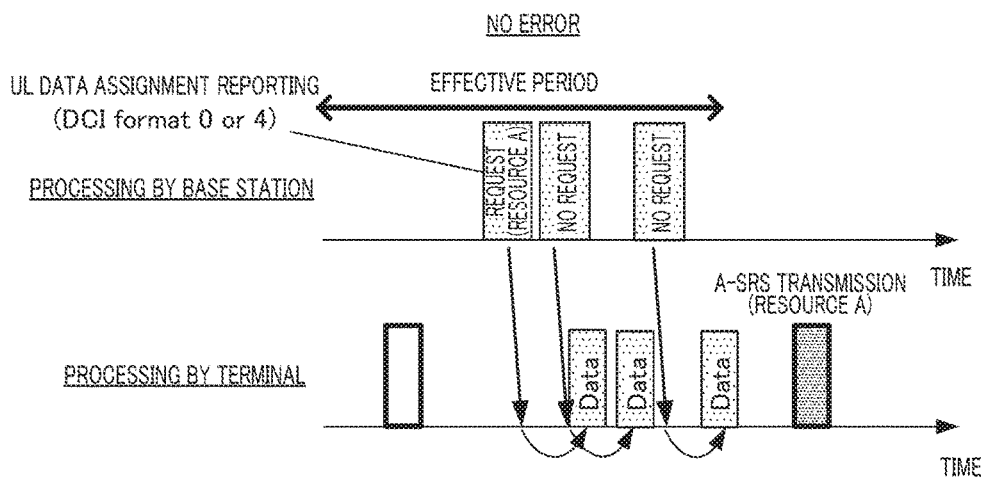
FIGS. 7A-7B are diagrams provided for describing the operation of a base station and a terminal according to Embodiment 3 of the present invention.
Figure 7B:
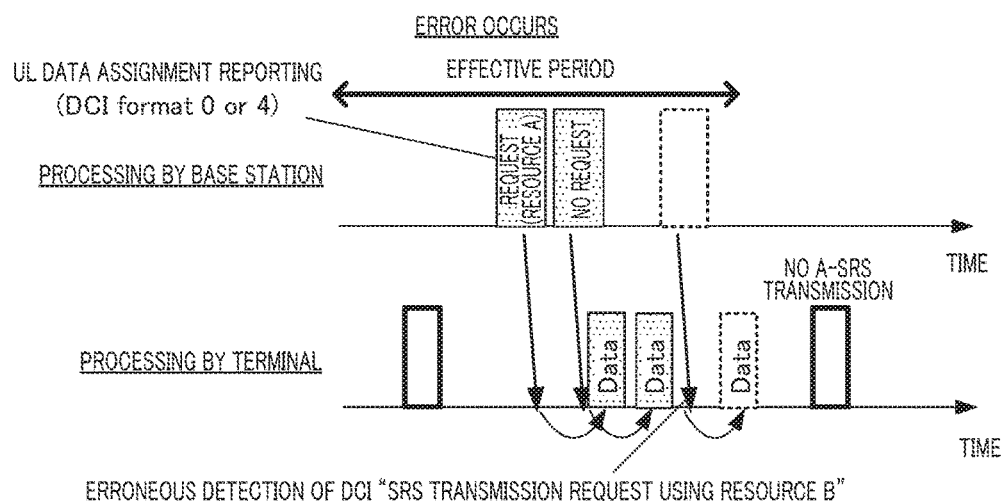

The operation of base station 100 and terminal 200 according to Embodiment 3 configured in the manner described above will be described with reference to FIG. 7. In FIGS. 7A and 7B, base station 100 transmits DCI that includes trigger information indicating an A-SRS transmission request in a single subframe and transmits DCI that includes trigger information indicating no A-SRS transmission request in uplink data assignment reporting in subframes other than the single subframe.

In FIG. 7A, terminal 200 correctly receives all pieces of DCI intended for terminal 200 without erroneous detection of DCI within the effective period. In addition, terminal 200 transmits an A-SRS using an SRS resource according to the A-SRS trigger information indicating a transmission request and detected in the single subframe within the effective period.

Meanwhile, in FIG. 7B, although base station 100 transmits DCI intended for terminal 200 in two subframes within a single effective period, terminal 200 detects DCI that includes trigger information indicating an A-SRS transmission request in a different subframe (i.e., erroneous detection). Since terminal 200 detects two pieces of DCI each of which includes trigger information indicating an A-SRS transmission request within the single effective period, terminal 200 transmits no A-SRS according to the "SRS transmission execution rule."

The SRS transmission control according to the "SRS transmission execution rule" as described above can reduce the probability of terminal 200 erroneously transmitting an A-SRS due to erroneous detection. Meanwhile, when terminal 200 erroneously detects DCI that includes trigger information indicating an A-SRS transmission request although base station 100 has not made an A-SRS transmission request even once during a certain effective period, terminal 100 erroneously transmits an A-SRS. However, when base station 100 makes an A-SRS transmission request even once during a single effective period, erroneous transmission of an A-SRS due to erroneous detection by terminal 200 can be prevented. In addition, erroneous transmission of data due to erroneous detection of the second DCI indicating the second A-SRS transmission request can be prevented.

The control of SRS transmission according to the "SRS transmission execution rule" described above allows base station 100 to cancel an A-SRS transmission request that has been reported to a certain terminal 200, by intentionally transmitting a plurality of transmission requests. Thus, the resource that has become available because of the cancellation can be allocated to different terminal 200 with higher priority. Accordingly, A-SRS resource allocation to terminals 200 according to priority is made possible, which in turn makes it possible to reduce the amount of delay in acquiring A-SRS reception quality information for terminal 200 with higher priority. As a result, the data transmission delay to terminal 200 with higher priority can be reduced.

When detecting a different piece of DCI that includes an A-SRS transmission request after detecting a first piece of DCI that includes an A-SRS transmission request in a single effective period, terminal 200 may treat data assignment according to the different piece of DCI as valid and treat only trigger information included in the different piece of DCI as invalid, or may treat both of the data assignment and trigger information as invalid. In the former case, when canceling an A-SRS transmission request that has been reported to certain terminal 200, base station 100 can perform new data assignment while canceling only the A-SRS transmission request. The latter case is effective when there is no data to be newly assigned, because base station 100 can cancel only an A-SRS transmission request without involving data assignment, and terminal 200 transmits no wasteful data. In addition, the former and the latter can be switched according to additional control information transmitted from base station 100 to terminal 200.

Embodiment 4

In Embodiment 4, the "SRS transmission execution rule" indicates that no A-SRS is transmitted upon detection of even one piece of DCI that includes trigger information indicating no A-SRS transmission after detection of a first piece of DCI that includes the trigger information indicating an A-SRS transmission request, or upon detection of a piece of DCI indicating an SRS resource different from the SRS resource indicated by the first piece of DCI within an effective period. In Embodiment 4, when transmitting the first piece of DCI that includes trigger information indicating an A-SRS transmission request, and thereafter reporting data assignment using a different piece of DCI of the same DCI format as that of the first piece of DCI, the base station includes, in the different piece of DCI, trigger information indicating the same SRS resource as the SRS resource indicated by the trigger information in the first piece of DCI. Stated differently, an assumption is made that base station 100 repeatedly transmits a piece of DCI that includes the trigger information indicating the same SRS resource in a single effective period. The base station and terminal according to Embodiment 4 are similar to base station 100 and terminal 200 according to Embodiment 1 in their basic configurations, so that Embodiment 4 will be described with reference to FIGS. 3 and 4.

In base station 100 according to Embodiment 4, when generating a first piece of DCI that includes trigger information indicating an A-SRS transmission request to terminal 200 in one subframe in a single effective period, configuration section 101 includes trigger information indicating the A-SRS transmission request in a different piece of DCI to be transmitted thereafter within the same effective period if a "predetermined condition" is satisfied. The "predetermined condition" is that the DCI format of a different piece of DCI is the same as that of the first piece of DCI. The SRS resource indicated by the trigger information included in the different piece of DCI is also matched with the SRS resource indicated by the trigger information included in the first piece of DCI. Stated differently, base station 100 according to Embodiment 4 repeatedly transmits a piece of DCI that includes the trigger information indicating the A-SRS transmission request within a single effective period as long as the "predetermined condition" is satisfied, basically.

In terminal 200 according Embodiment 4, transmission controlling section 206 determines whether or not to perform SRS transmission on the basis of the "SRS transmission execution rule" and the reception condition of trigger information. In Embodiment 4, the "SRS transmission execution rule" indicates that upon detection of a piece of DCI that includes trigger information indicating no A-SRS transmission request even once after detection of a first piece of DCI that includes trigger information indicating an A-SRS transmission request, or upon detection of a piece of DCI that indicates an SRS resource different from the SRS resource indicated by the first piece of DCI within an effective period, no A-SRS is transmitted in any common SRS subframe corresponding to the effective period. Specifically, when detecting a piece of DCI that includes trigger information indicating a transmission request first in an effective period corresponding to the common SRS subframe of subframe n and thereafter detecting a piece of DCI that includes trigger information indicating no A-SRS transmission request in a different subframe after the subframe in which the first piece of DCI is detected (i.e., period from the initial detection timing to the subframe corresponding to subframe n-k) even once in the effective period, transmission controlling section 206 determines that there is no A-SRS transmission. In addition, when detecting a piece of DCI that includes trigger information indicating an A-SRS transmission request using an SRS resource different from the SRS resource indicated by the first piece of DCI, transmission controlling section 206 also determines that there is no A-SRS transmission. In this case, transmission controlling section 206 outputs an instruction to cancel the instruction to generate a reference signal to reference signal generating section 204.

The operation of base station 100 and terminal 200 according to Embodiment 4 configured in the manner described above will be described with reference to FIG. 8.

Figure 8A:
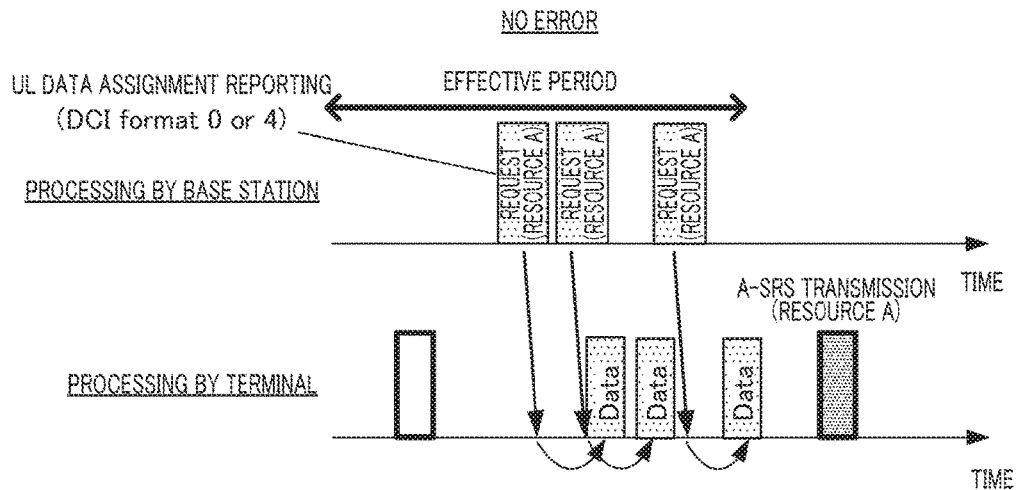
FIGS. 8A-8B are diagrams provided for describing the operation of a base station and a terminal according to Embodiment 4 of the present invention.

In FIG. 8A, base station 100 transmits a piece of DCI that includes trigger information indicating the presence of an A-SRS transmission request in a single subframe and repeatedly transmits a piece of DCI that includes trigger information indicating the presence of an A-SRS transmission request after the single subframe in a single effective period. In FIG. 8A, terminal 200 correctly detects all pieces of DCI. Terminal 200 transmits an A-SRS according to the "SRS transmission execution rule" under the detection state of the pieces of DCI.

Figure 8B:
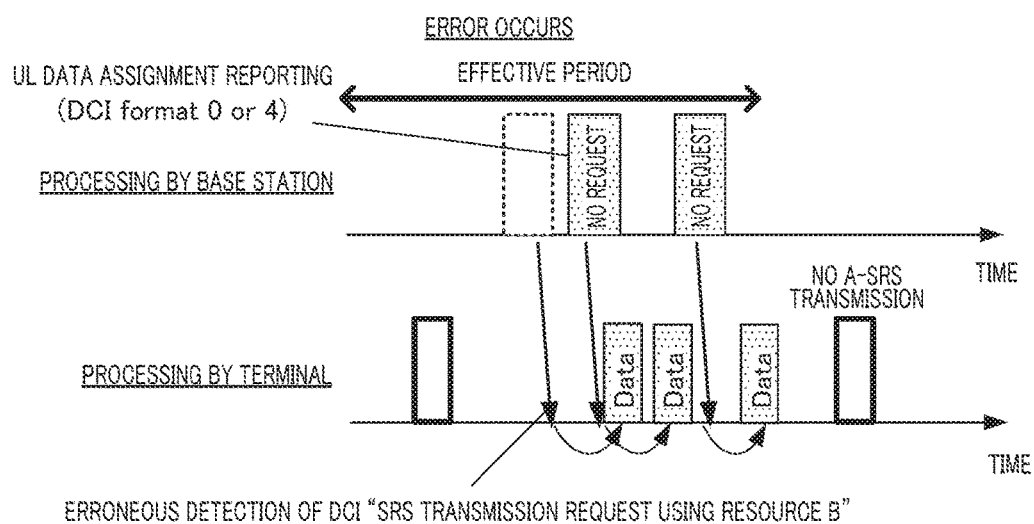

On the other hand, FIG. 8B illustrates a case where base station 100 makes no A-SRS transmission request to terminal 200 within a certain effective period. In FIG. 8B, base station 100 transmits DCI that includes trigger information indicating no A-SRS transmission request in two subframes within the effective period. Meanwhile, terminal 200 detects two pieces of DCI actually transmitted from base station 100 after erroneously detecting a piece of DCI that includes trigger information indicating an A-SRS transmission request. Terminal 200 transmits no A-SRS under this detection state of the pieces of DCI according to the "SRS transmission execution rule."

In addition, although the operation is not illustrated in the drawings, when erroneously detecting that the third piece of DCI transmitted from base station 100 and thus determining that the third piece of DCI is DCI that includes A-SRS trigger information indicating an A-SRS transmission request using resource B in FIG. 8A, terminal 200 performs no A-SRS transmission because the indicated resource is a resource different from the resource indicated by the previously detected A-SRS trigger information.

The control of SRS transmission according to the DCI transmission rule of base station 100 and the "SRS transmission execution rule" of terminal 200 in the manner described above, even when erroneously detecting DCI that includes trigger information indicating A-SRS transmission, terminal 200 can determine that terminal 200 has erroneously detected the DCI because of trigger information included in the DCI to be received by terminal 200 after the erroneous detection of DCI. Accordingly, the probability of terminal 200 erroneously detecting DCI, or the probability of terminal 200 transmitting an A-SRS using an SRS resource different from the SRS resource required by base station 100 due to erroneous detection of A-SRS trigger information by terminal 200 can be reduced.

As long as base station 100 satisfies the abovementioned "predetermined condition," repeatedly transmitting DCI that includes trigger information indicating an A-SRS transmission request in a single effective period allows an A-SRS to be correctly transmitted even when terminal 200 erroneously detects DCI that includes trigger information indicating an A-SRS transmission request. As a result, base station 100 can measure appropriate channel quality.

In addition, the control of SRS transmission according to the "SRS transmission execution rule" as described above allows base station 100 to cancel an A-SRS transmission request that has been reported to a certain terminal 200. For example, when base station 100 makes an A-SRS transmission request with a certain SRS resource (e.g., resource A) to first terminal 200 first but needs second terminal 200 with higher priority to transmit an A-SRS using the same resource (resource A), base station 100 transmits assignment control information that is of the same DCI format as that used for the previous A-SRS transmission request and that includes trigger information indicating no A-SRS transmission request to terminal 200, in order to cancel the A-SRS transmission request that has been transmitted to first terminal 200. In this case, according to the "SRS transmission execution rule," first terminal 200 transmits no A-SRS. The resource thus made available in this case can be allocated to different terminal 200 with higher priority. Thus, A-SRS resource allocation to terminals 200 according to priority is made possible, and the amount of delay in acquiring A-SRS reception quality information for terminal 200 with higher priority can be reduced. As a result, the data transmission delay to terminal 200 with higher priority can be reduced.

The control of SRS transmission according to the "transmission execution rule" described above controls terminals in a way that prevents the terminals from transmitting any A-SRS when the terminals detect DCI that includes trigger information indicating an A-SRS transmission request and thereafter detects DCI that indicates an SRS resource different from the SRS resource indicated by the first DCI within an effective period. Accordingly, it is possible to reduce the probability of a terminal transmitting an A-SRS using a wrong resource due to erroneous detection of DCI that indicates A-SRS trigger information indicating a resource different from a resource actually indicated by the base station within an effective period, thus, reducing the probability of the terminal unnecessarily interfering with a different terminal or a different cell.

It should be noted that, it is possible to use only any one of the two "SRS transmission execution rules" in this embodiment. For example, it is possible to use only the "SRS transmission execution rule" that indicates that no A-SRS is transmitted upon detection of even one piece of DCI that includes trigger information indicating no A-SRS transmission request after detection of the first DCI that includes trigger information indicating an A-SRS transmission request, or to use only the "SRS transmission execution rule" that indicates no A-SRS is transmitted when a terminal receives DCI that includes trigger information indicating an A-SRS transmission request first and thereafter detects DCI that indicates an SRS resource different from the SRS resource indicated by the first DCI. In this case, the DCI that indicates a different SRS resource is DCI that includes trigger information indicating an A-SRS configuration including a different SRS resource.

Embodiment 5

In Embodiment 5, the "SRS transmission execution rule" indicates that no A-SRS is transmitted upon detection of first DCI that includes trigger information indicating an A-SRS transmission request and detection of even one piece of different DCI that includes trigger information indicating no A-SRS transmission request within an effective period, as in Embodiment 4. However, Embodiment 5 is different from Embodiment 4 in that the "SRS transmission execution rule" indicates that even upon detection of a different piece of DCI that indicates an SRS resource different from the SRS resource indicated by the first piece of DCI, an A-SRS is transmitted according to the trigger information included in the different piece of DCI when the DCI format of the different piece of DCI is different from the DCI format of the first piece of DCI. As in Embodiment 4, when transmitting a first piece of DCI that includes trigger information indicating an A-SRS transmission request and thereafter reporting data assignment by a piece of DCI different from the first DCI but of the same DCI format as that of the first piece of DCI in an effective period, the base station includes, in the different piece of DCI, trigger information indicating the same SRS resource as the SRS resource indicated by the trigger information in the first piece of DCI in Embodiment 5. Specifically, an assumption is made that base station 100 repeatedly transmits DCI that includes trigger information indicating the same SRS resource within a single effective period. The base station and terminal according to Embodiment 5 are similar to base station 100 and terminal 200 according to Embodiment 1 in their basic configurations, so that Embodiment 5 will be described with reference to FIGS. 3 and 4.

In base station 100 according to Embodiment 5, when generating a first piece of DCI that includes trigger information indicating an A-SRS transmission request for terminal 200 in one subframe within an effective period, configuration section 101 includes trigger information indicating an A-SRS transmission request in a different piece of DCI to be transmitted thereafter within the effective period when a "predetermined condition" is satisfied. The "predetermined condition" is that the DCI format of the different piece of DCI is the same as that of the first piece of DCI. In addition, the SRS resource indicated by the trigger information included in the different piece of DCI is also matched with the SRS resource indicated by the trigger information included in the first piece of DCI. Specifically, base station 100 according to Embodiment 5 repeatedly transmits DCI that includes trigger information indicating an A-SRS transmission request within a single effective period as long as the "predetermined condition" is satisfied, basically.

However, when reallocating an A-SRS resource used in a previous transmission request to each terminal 200, in accordance with the A-SRS assignment state for terminals 200, configuration section 101 changes the DCI format of the assignment control information to another and includes trigger information indicating an A-SRS transmission request in the assignment control information.

In terminal 200 according to Embodiment 5, transmission controlling section 206 determines whether or not to perform SRS transmission on the basis of the "SRS transmission execution rule" and the reception condition of trigger information. The "SRS transmission execution rule" in Embodiment 5 indicates that upon detection of a piece of DCI that includes trigger information indicating no A-SRS transmission request even once after detection of a piece of DCI that includes trigger information indicating an A-SRS transmission request within an effective period, no A-SRS is transmitted in any common SRS subframe corresponding to the effective period. Specifically, when detecting a piece of DCI that includes trigger information indicating an A-SRS transmission request once in an effective period corresponding to a common SRS subframe of subframe number n and detecting a piece of DCI that includes trigger information indicating no A-SRS transmission request in a different subframe transmitted after the common SRS subframe (i.e., during a period from the initial detection timing until a subframe corresponding to subframe n–k) in the same period, transmission controlling section 206 determines that no A-SRS transmission is required. In this case, transmission controlling section 206 outputs an instruction to cancel the instruction to generate a reference signal to reference signal generating section 204.

In addition, the "SRS transmission execution rule" in Embodiment 5 includes a rule indicating that even upon detection of a different piece of DCI indicating an SRS resource different from the SRS resource indicated by the first piece of DCI that includes trigger information indicating an A-SRS transmission request, an A-SRS is transmitted according to the trigger information included in the different piece of DCI when the DCI format of the different piece of DCI is different from the DCI format of the first piece of DCI. Specifically, transmission controlling section 206 overwrites the information about the SRS resource indicated by the trigger information included in the piece of DCI detected immediately before the different piece of DCI with the information about the SRS resource indicated by the trigger information included in the different piece of DCI. In this case, transmission controlling section 206 outputs an instruction to generate a reference signal to reference signal generating section 204 and also outputs the information about the updated SRS resource to transmission signal forming section 207.

Figure 9:
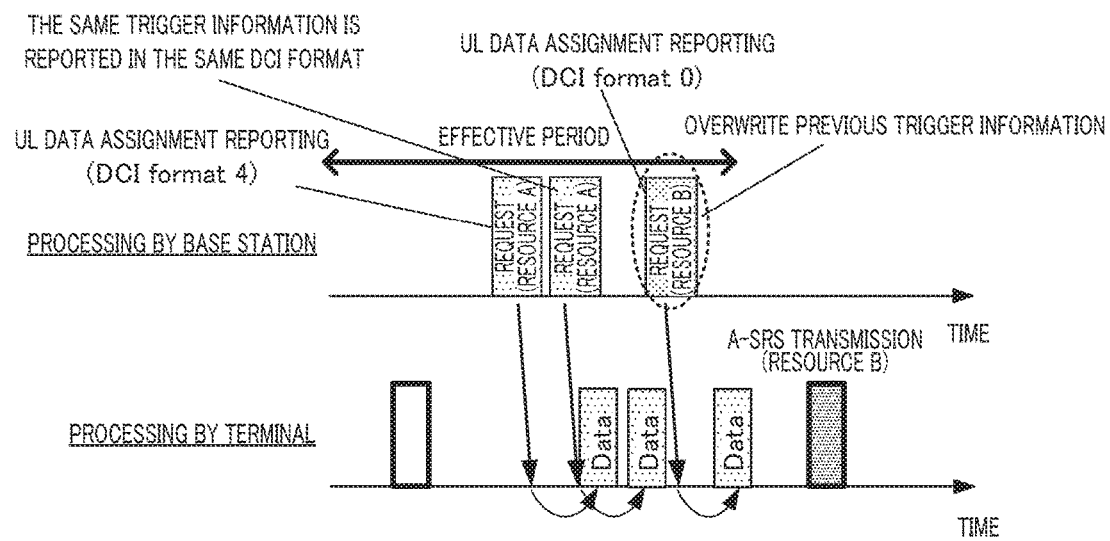
FIG. 9 is a diagram provided for describing the operation of a base station and a terminal according to Embodiment 5 of the present invention.

The operation of base station 100 and terminal 200 according to Embodiment 5 configured in the manner described above will be described with reference to FIG. 9. In FIG. 9, base station 100 transmits a piece of DCI that includes trigger information indicating an A-SRS transmission request in one subframe and repeatedly transmits a piece of DCI that includes trigger information indicating an A-SRS transmission request in subsequent subframes in a single effective period. In this case, an A-SRS transmission request for a plurality of antennas is made by DCI format 4 (i.e., MIMO transmission assignment information). Moreover, an A-SRS transmission request for a plurality of antennas is made using resource A.

In addition, in FIG. 9, base station 100 transmits a piece of DCI formed by including trigger information indicating an A-SRS transmission request in assignment control information of DCI format 0 after repeatedly transmitting a piece of DCI formed by including trigger information indicating an A-SRS transmission request in assignment control information of DCI format 4. This is because terminal 200 is caused to transmit an A-SRS using a resource different from a previously requested SRS resource (e.g., single antenna transmission using resource B) due to a change in the propagation path conditions of terminal 200 (such as a case where data transmission becomes difficult using spatial multiplexing transmission using a plurality of antennas due to degradation of the quality of propagation path, for example).

Meanwhile, terminal 200 detects an A-SRS transmission request using DCI format 0 after detecting an A-SRS transmission request using DCI format 4. According to the "SRS transmission execution rule," terminal 200 transmits an A-SRS according to the A-SRS trigger information of DCI detected in a later subframe (i.e., trigger information of DCI format 0) under the detection state of DCI.

According to the DCI transmission rule by base station 100 and the "SRS transmission execution rule" by terminal 200, base station 100 can change the SRS resource to another by transmitting a plurality of pieces of trigger information of different DCI formats within the effective period. Thus, base station 100 can cause each terminal 200 to transmit an A-SRS using an SRS resource corresponding to a change in the propagation path conditions of each terminal 200. In addition, it is possible to prevent a collision between SRS resources allocated to a plurality of terminals 200.

Moreover, as in Embodiment 4, as long as base station 100 satisfies the abovementioned "predetermined condition," repeatedly transmitting a piece of DCI that includes trigger information indicating an A-SRS transmission request within a single effective period allows an A-SRS to be correctly transmitted even when terminal 200 fails to detect a piece of DCI that includes trigger information indicating an A-SRS transmission request. As a result, base station 100 can measure appropriate channel quality.

As in Embodiment 4, the control of SRS transmission according to the "SRS transmission execution rule" described above allows base station 100 to cancel an A-SRS transmission request that has been reported to certain terminal 200.

The description provided above assumes that base station 100 repeatedly transmits a piece of DCI that includes trigger information indicating an A-SRS transmission request within a single effective period as long as the "predetermined condition" is satisfied basically, as in Embodiment 4. Meanwhile, when a first piece of DCI that includes trigger information indicating an A-SRS transmission request to terminal 200 is generated in one subframe with in an effective period, trigger information indicating an A-SRS transmission request may not be included in a different piece of DCI that is to be transmitted after the first piece of DCI during the effective period and that is of the same format as that of the first piece of DCI as in Embodiment 3. In this case, terminal 200 performs no A-SRS transmission when detecting the different piece of DCI that includes trigger information indicating an A-SRS transmission request and that is of the same DCI format as that of the first piece of DCI. However, when further detecting a piece of DCI that includes trigger information indicating an A-SRS transmission request and that is of a DCI format different from that of the first piece of DCI, terminal 200 transmits an A-SRS using an SRS resource according to the A-SRS trigger information included in the piece of DCI of the different DCI format.

An SRS resource may be changed to another only upon detection of DCI that includes trigger information indicating an A-SRS transmission request and that is of DCI format 0 after detection of DCI that includes trigger information indicating an A-SRS transmission request and that is of a DCI format other than DCI format 0. Specifically, overwriting the SRS resource corresponding to a previous A-SRS transmission request (including the number of antennas) by base station 100 is allowed only for A-SRS transmission requests for single antenna transmission. A-SRS transmission requests for single antenna or A-SRS transmission requests using DCI format 0 are made when terminal 200 in the transmission mode using multiple antenna transmission is caused to fall back to single antenna transmission. In particular, such an A-SRS transmission request is made when the propagation path conditions of terminal 200 are degraded. Terminal 200 in a situation where the propagation path conditions are degraded can communicate only in a single antenna transmission mode. Thus, it is necessary to cause terminal 200 to perform A-SRS transmission for single antenna transmission as soon as possible. On the other hand, it is also possible to employ a configuration in which changing an SRS resource is not allowed upon detection of DCI that includes trigger information indicating an A-SRS transmission request and that is of a DCI format other than DCI format 0 after detection of DCI that includes trigger information indicating an A-SRS transmission request and that is of DCI format 0. With this configuration, the probability of terminal 200 performing erroneous transmission after erroneously detecting DCI of a DCI format other than DCI format 0 can be reduced.

Other Embodiments (1) In the embodiments described above, the parameters defining an SRS resource include cyclic shift, comb, the number of RBs (or bandwidth), the RB position (or the frequency position where the SRS bandwidth starts), frequency hopping pattern, the number of antennas, and/or the like.

(2) In the embodiments described above, the parameters defining an SRS resource may include information about component carriers when carrier aggregation is applied to the communication system. Component carriers are also called cells. In addition, each terminal is configured with a set of component carriers (CCs) while each set of CCs includes one Primary Cell (PCell) and one or more Secondary Cells (SCells). In this case, A-SRS transmission using PCell may be associated with DCI format 0 while A-SRS trigger transmission using a SCell may be associated with DCI format 1A in the A-SRS transmission rule configuration information.

(3) In the embodiments described above, the starting position of bandwidth, the bandwidth, Cyclic shift, and Comb number are used as the basic configuration parameters for SRS resource configuration. However, the parameters are not limited to these parameters, and parameters other than the abovementioned ones may be included in the basic configuration parameters for SRS resource configuration.

(4) In the embodiments described above, when terminal 200 simultaneously receives pieces of DCI each of which includes trigger information indicating an A-SRS transmission request and each of which is of a different DCI format in the same subframe, terminal 200 may treat these pieces of DCI as invalid. Accordingly, terminal 200 can be prevented from wrongly transmitting an A-SRS.

(5) In the embodiments described above, base station 100 may configure whether or not to include SRS trigger information in DCI for each terminal 200 and notify each terminal 200 of the result of configuration by RRC signaling. In this case, it is possible to reduce the number of bits of DCI to be transmitted to terminal 200 not using an A-SRS (e.g., terminal using only speech communication) or terminal 200 using an application not using an A-SRS can be reduced, thus making it possible to reduce the overhead. In addition, base station 100 may configure the number of bits to represent SRS trigger information and notify terminal 200 of the result of configuration via RRC signaling.

(6) In the embodiments described above, each terminal 200 is configured to transmit an A-SRS in a common SRS subframe, but the present invention is by no means limited to these embodiments, and each terminal 200 may be configured to transmit an A-SRS in a specific SRS subframe. Stated differently, base station 100 may further configure terminal-specific SRS subframes from a group of common SRS subframes and allow terminals 200 to perform A-SRS transmission in the terminal-specific SRS subframes. In this case, the periodicity Np-ue of a terminal-specific SRS subframe is configured to be equal to or longer than the periodicity of the common SRS subframe, and the duration of the effective period to trigger an A-SRS in the same SRS subframe is Np_ue.

(7) The LTE system described above is often called 3GPP Release 8, and the LTE-A system is often called Release 10. The LTE-A system has backward compatibility with the LTE system.

(8) When terminal 200 is configured with a plurality of component carriers (may be called cells), the technique described in the embodiments is applied only upon detection of A-SRS trigger information on a first CC and then a different piece of DCI that includes A-SRS trigger information indicating an A-SRS transmission request on the same first CC within a single effective period, and upon detection of a different piece of DCI that includes A-SRS trigger information indicating an A-SRS transmission request on a second CC different from the first CC, an A-SRS may be transmitted on the second CC according to the trigger information included in the different piece of DCI.

(9) Component carriers are each defined by a physical cell ID and a carrier frequency, and often called a cell.

(10) It is also possible to configure the correspondence between DCI formats and pieces of information about SRS transmission power in addition to the SRS resource parameters described above. For example, in a system configured to perform interference control in a coordinated manner between cells, an A-SRS is triggered using a DCI format associated with a low transmission power setting in a subframe whose interference with a different cell is preferably small, while an A-SRS is triggered using a DCI format associated with a high transmission power setting in a subframe whose interference with a different cell may be large. Accordingly, A-SRS transmission power can be flexibly configured without any increase in the control information.

(11) The SRS to be transmitted from each terminal 200 may be used for weight control (or precoding) of downlink antennas and/or the like in addition to estimation of the propagation path conditions, uplink MCS configuration, frequency scheduling, and each antenna weight (directivity) control by base station 100. In this case, configuring a different DCI format with an SRS resource for uplink MCS configuration, frequency scheduling, and antenna weight control, and an SRS resource for downlink antenna weight control makes it possible to trigger an A-SRS in accordance with each application without any increase in the number of reporting bits.

(12) Each of the embodiments has been described with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an antenna array formed of a plurality of antennas, and/or the like.

For example, 3GPP LTE does not specify the number of physical antennas forming an antenna port, but specifies an antenna port as a minimum unit allowing each base station to transmit a different reference signal.

In addition, an antenna port may be specified as a minimum unit for multiplication of precoding vector weighting.

(13) In the embodiments described above, uplink data is transmitted via a Physical Uplink Shared Channel (PUSCH) while downlink data is transmitted via a Physical Downlink Shared Channel (PUSCH), but may be transmitted via another channel.

(14) The "SRS transmission execution rule" in each of the embodiments described above may be switched to another depending on the cell environment, the communication environment of the terminal, and/or the like. In this case, base station 100 may broadcast information indicating which one of the plurality of "SRS transmission execution rules" is to be used to all terminals 200 in the cell or may report the information to the terminals 200 individually (by RRC signaling).

(15) The above-noted embodiments have been described by examples of hardware implementations, but the present invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, the drawings, and the abstract included in Japanese Patent Application No. 2010-255843, filed on Nov. 16, 2010, is incorporated herein by reference in its entirety.

INDUSTRIAL APPLICABILITY

The communication apparatus and SRS transmission method according to the present invention are useful in that they are capable of preventing degradation in the system throughput by reducing the possibility of occurrence of a difference in understanding of the presence or absence of SRS transmission or understanding of an SRS resource between the SRS transmission side and reception side.

REFERENCE SIGNS LIST

100 Base station
101 Configuration section
102, 103 Coding and modulation section
104 Transmission processing section
105, 208 RF transmitting section
106, 201 Antenna
107, 202 RF receiving section
108, 203 Reception processing section
109 Data receiving section
110 SRS receiving section
200 Terminal
204 Reference signal generating section
205 Data signal generating section
206 Transmission controlling section
207 Transmission signal forming section

The invention claimed is:

1. A communication apparatus, comprising:
circuitry, which, in operation, detects control information indicating whether transmission of a sounding reference signal (SRS) is requested and indicating a transmission parameter of the SRS, the control information being received from a base station; and
a transmitter, which, in operation, transmits the SRS based on the detected control information, when two or more receptions of the control information, which indicate different transmission parameters, are not detected from the base station within a determined period.

2. The communication apparatus according to claim 1 wherein:
when two or more receptions of the control information are received within the determined period, the two or more receptions of the control information indicate an identical transmission parameter.

3. The communication apparatus according to claim 1 wherein:
when the circuitry detects two or more instances of the control information, which indicate different transmission parameters, within the determined period, the transmitter, in operation, does not transmit the SRS.

4. The communication apparatus according to claim 1 wherein:
the transmitter, in operation, transmits the SRS in first subframe(s) n among subframes, which are located at or after a k-th subframe from a subframe in which the control information requesting the transmission of the SRS is detected, the subframes being configured based on periodicity Np and a subframe offset, and
the determined period is a period from subframe n−(Np−k+1) to subframe n−k.

5. The communication apparatus according to claim 1 wherein the transmitter, in operation, transmits the SRS in a first subframe among subframes, which are located at or after a k-th subframe from a subframe in which the control information requesting the transmission of the SRS is detected, the subframes being configured based on a periodicity and a subframe offset.

6. The communication apparatus according to claim 1 wherein the transmission parameter indicates at least one of a bandwidth, an RB position where the bandwidth starts, a Cyclic Shift, a transmission Comb, a number of antenna ports, and whether frequency hopping is employed.

7. The communication apparatus according to claim 1 wherein the control information is received in one of a plurality of formats, and the transmission parameter is identified based on the format.

8. The communication apparatus according to claim 1 wherein the SRS is an aperiodic SRS triggered by downlink control information.

9. A communication method, comprising:
detecting control information indicating whether transmission of a sounding reference signal (SRS) is requested and indicating a transmission parameter of the SRS, the control information being received from a base station; and
transmitting the SRS based on the detected control information, when two or more receptions of the control information, which indicate different transmission parameters, are not detected from the base station within a determined period.

10. The communication method according to claim 9 wherein:
when two or more receptions of the control information are received within the determined period, the two or more receptions of the control information indicate an identical transmission parameter.

11. The communication method according to claim 9 wherein:

when the circuitry detects two or more instances of the control information, which indicate different transmission parameters, within the determined period, the SRS is not transmitted.

12. The communication method according to claim 9 wherein:
the transmitting includes transmitting of the SRS in first subframe(s) n among subframes, which are located at or after a k-th subframe from a subframe in which the control information requesting the transmission of the SRS is detected, the subframes being configured based on periodicity Np and a subframe offset, and
the determined period is a period from subframe n−(Np−k+1) to subframe n−k.

13. The communication method according to claim 9 wherein the transmitting includes transmitting of the SRS in a first subframe among subframes, which are located at or after a k-th subframe from a subframe in which the control information requesting the transmission of the SRS is detected, the subframes being configured based on a periodicity and a subframe offset.

14. The communication method according to claim 9 wherein the transmission parameter indicates at least one of a bandwidth, an RB position where the bandwidth starts, a Cyclic Shift, a transmission Comb, a number of antenna ports, and whether frequency hopping is employed.

15. The communication method according to claim 9 wherein the control information is received in one of a plurality of formats, and the transmission parameter is identified based on the format.

16. The communication method according to claim 9 wherein the SRS is an aperiodic SRS triggered by downlink control information.

* * * * *

UNITED STATES PATENT AND TRADEMARK OFFICE
CERTIFICATE OF CORRECTION

PATENT NO. : 9,763,237 B2
APPLICATION NO. : 15/190051
DATED : September 12, 2017
INVENTOR(S) : Akihiko Nishio et al.

It is certified that error appears in the above-identified patent and that said Letters Patent is hereby corrected as shown below:

On the Title Page

Item (56):
--EP 2 416 511 B1 11/2012-- has been omitted from the issued patent.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*